April 5, 1966 D. A. WILLIAMS 3,244,810
INTERCEPT SCANNING SYSTEM
Filed Nov. 1, 1962 3 Sheets-Sheet 1

INVENTOR.
David A. Williams

April 5, 1966    D. A. WILLIAMS    3,244,810
INTERCEPT SCANNING SYSTEM
Filed Nov. 1, 1962    3 Sheets-Sheet 2
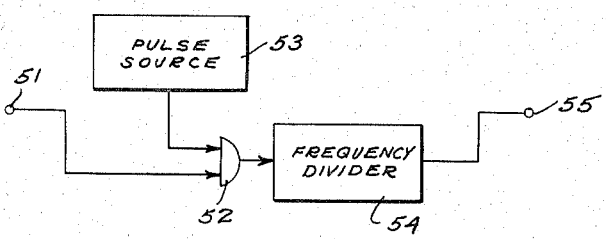
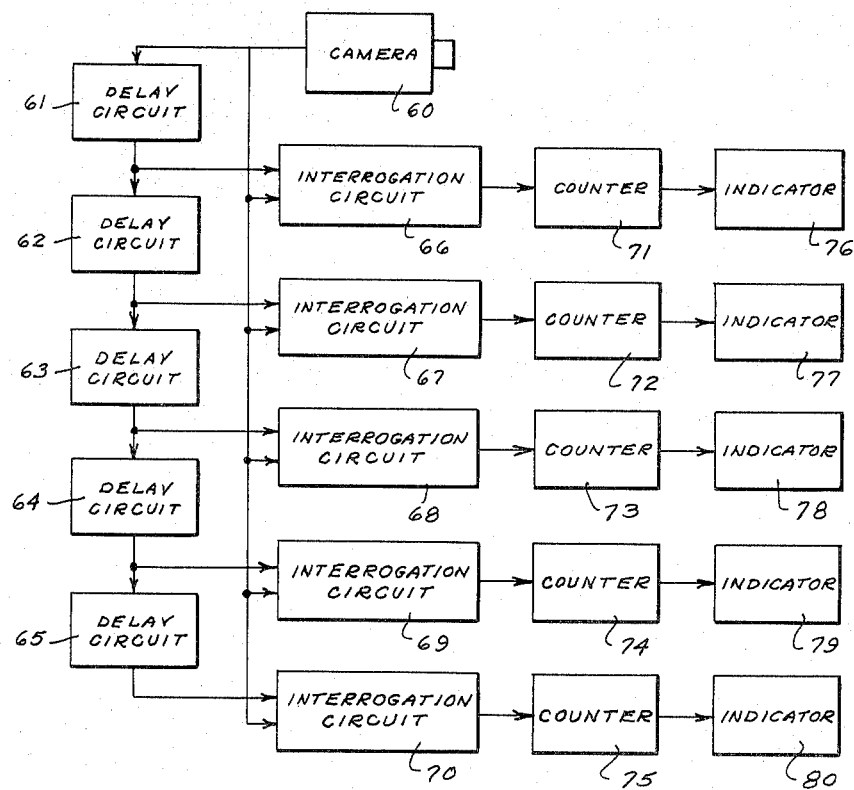
INVENTOR.
David A. Williams
BY
ATTORNEYS April 5, 1966  D. A. WILLIAMS  3,244,810
INTERCEPT SCANNING SYSTEM
Filed Nov. 1, 1962  3 Sheets-Sheet 3
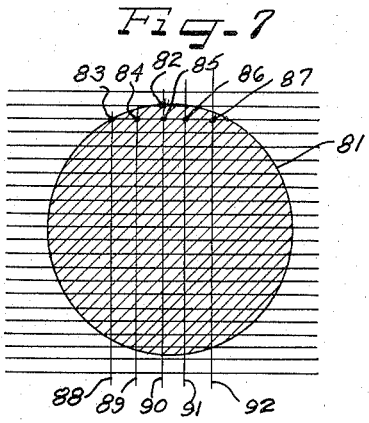
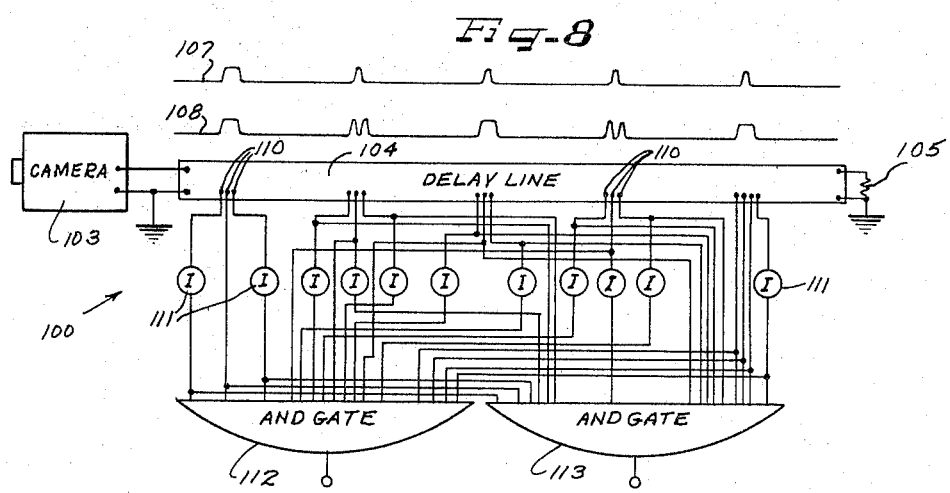
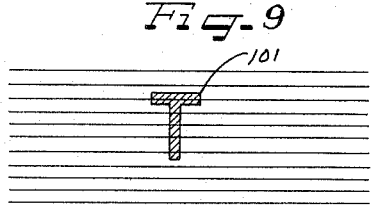 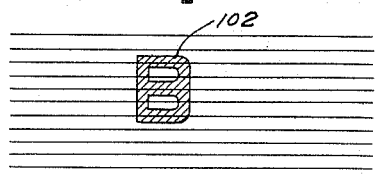
INVENTOR.
David A. Williams
BY
ATTORNEYS

United States Patent Office 3,244,810
Patented Apr. 5, 1966

3,244,810
INTERCEPT SCANNING SYSTEM
David A. Williams, Michigan City, Ind., assignor, by mesne assignments, to Dage-Bell Corporation, Michigan City, Ind., a corporation of Delaware
Filed Nov. 1, 1962, Ser. No. 234,722
8 Claims. (Cl. 178—6.8)

This invention was evolved with the general object of providing a scanning system for determining characteristics of an image in an image area. The system of this invention uses an intercept scanning technique and has a wide range of applications including the discernment of shapes or patterns, character recognition, and the counting and measurement of the shapes and dimensions of various images, such as those produced from spray droplets or other particles, blood cells, bacteria, electron microscope photographs of molecular or crystal structure, dust impurities, solid particles suspended in liquids, tracks of nuclear particles in bubble chambers, cloud chambers, or nuclear emulsions, pits or flaws on metal surfaces, etc. The system is comparatively simple in operation, extremely fast, accurate and reliable and produces output signals in digital form, readily applied to computer, registering, processing or control apparatus.

According to this invention, means are provided for scanning an image area to produce a video signal, preferably a conventional television camera where an image area on the screen of a camera tube is scanned with a "spot" moving in a line pattern, although other forms of scanning means may be employed. Sensing means are provided for sensing a change in the video signal produced by the interception of a certain portion of an image in the image area, preferably the initial interception of the image. Additional sensing means are provided for measuring the amplitude of the video signal produced at a certain time after the sensed change of the video signal. In this way an intercept scanning system is provided by which a characteristic of the image is determined, i.e. it is determined whether or not the image extends over two spaced points in the image area, one of the points being at an edge of the image and the other having a fixed spacial relationship to the one point. Thus the determination is made independently of the position of the image within the image area which is scanned.

Additional features of the invention relate to extensions of the intercept scanning technique to the discernment of shapes or patterns, as in character recognition, and to the counting and measurement of the shapes and dimensions of various images. In certain embodiments of the invention, time delay means are combined with interrogation gate means in determining whether the video signal exists at a certain point. In another embodiment of the invention, a delay line is combined with gate means to determine the coincidence of signals corresponding to spaced points in an image area.

Further features of the invention relate to circuit arrangements which are comparatively simple while being fast, accurate and reliable in operation, and which develop output signals of readily usable digital form.

These and other objects, features and advantages of the invention will become more fully apparent from the following detailed description taken in conjunction with the accompanying drawings which illustrate preferred embodiments and in which:

FIGURE 1 is a block diagram of one form of intercept scanning system constructed according to this invention, and designed for the measurement of a dimension of an image;

FIGURE 2 diagrammatically illustrates a portion of a scanning raster of the screen of a television camera of the system of FIGURE 1, showing the principles of operation of the system;

FIGURE 5 is a block diagram of another form of time delay circuit usable in the systems of FIGURES 1 and 3, using a frequency divider;

FIGURE 6 is a block diagram of a further form of intercept scanning system constructed according to the invention, designed for the measurement of multiple dimensions of an image along parallel lines;

FIGURE 7 diagrammatically illustrates a portion of a scanning raster of the screen of a television camera of the system of FIGURE 6, showing the principles of operation of the system;

FIGURE 8 is a schematic diagram of still another form of intercept scanning system constructed according to the invention, designed for character recognition; and FIGURES 9 and 10 diagrammatically illustrate portions of a scanning raster of the screen of the television camera of the system of FIGURE 8 with different characters thereon, to illustrate the principle of operation thereof.

Figure 1:
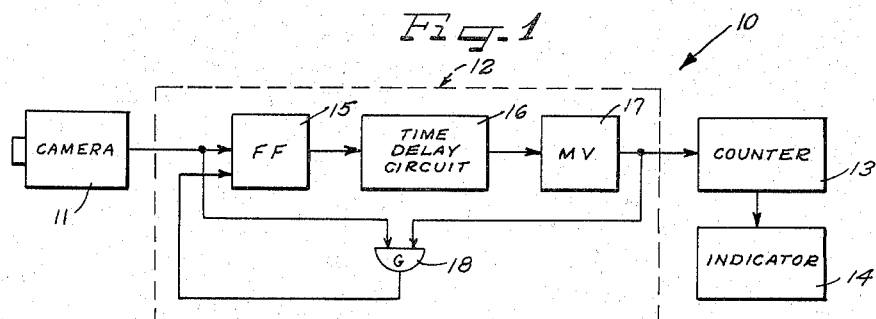

In FIGURE 1, reference numeral 10 generally designates a television system designed for the measurement of a dimension of the image of an object. In the system 10, the image of an object is developed on the screen of a conventional television camera 11, the screen being scanned line-by-line by the "spot" of the cathode ray beam of a camera tube to develop a video signal which is amplified by amplifiers within the camera 11. The amplified video signal is applied to an interrogation circuit 12 the operation of which is initiated by the leading edge of a video pulse produced by the first intercept of an image. The circuit then functions to determine the number of intercepts produced along a line perpendicular to or at a substantial angle to the direction of the scanning lines. In response to each intercept, a pulse is applied to a counter 13 and the number of pulses is registered on an indicator 14 connected to the output of the counter 13.

Figure 4:
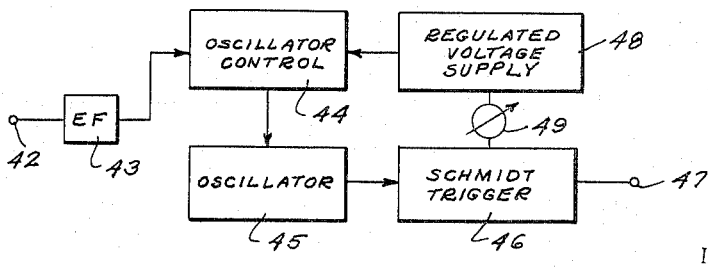
FIGURE 4 is a block diagram of one form of time delay circuit usable in the systems of FIGURES 1 and 3, using an oscillator.

The interrogation circuit 12 comprises a bistable circuit or flip-flop 15 which is triggered "on" by the leading edge of a video pulse produced by the first intercept of the scanning spot with an image. The flip-flop 15 then initiates operation of a time delay device 16, operative to produce an output signal after a time interval which may be equal to or somewhat less or greater than the time required to scan one line. The time delay device may, for example, have a circuit as illustrated in FIGURE 4 using an oscillator operated through one cycle at an operating frequency equal to or somewhat less or greater than the line frequency. In the alternative, a high frequency pulse source, gate circuit and frequency divided may be used as illustrated in FIGURE 5, described hereinbelow.

The output signal from the time delay circuit 16 triggers a monostable multivibrator 17 which generates a short duration pulse, applied to one input of a gate circuit 18. The video signal is applied to the other input of the gate circuit 18 and is of a polarity such as to close the gate when an image is being scanned, so that the pulse from the multivibrator 17 is not transmitted to the flip-flop 15 and the time delay circuit 16 is operated through another cycle. If, however, a video signal is not present, the gate 18 is enabled and a pulse is applied from the multivibrator 17 to the flip-flop 15 to trigger the flip-flop 15 to its initial "off" condition and prevent further operation of the time delay circuit 16.

Figure 2:
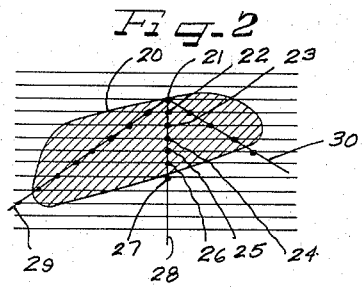

The principle of operation may be clarified by reference to FIGURE 2, which shows diagrammatically the upper portion of a scanning raster with the vertically spaced horizontal lines representing the path of movement of the spot in the scanning operation. The line 20 represents the outline of a solid image produced on the face of the screen of the television camera 11. To simplify and clarify illustration and discussion, the illustrated scanning lines are much fewer in number and are spaced much further apart than is generally the case in practice.

When the scanning spot reaches a point as indicated by reference numeral 21, it intercepts the image 20 near the top edge thereof and develops the leading edge of a pulse in the video signal. This leading edge of the video signal triggers the flip-flop 15 and initiates operation of the time delay circuit 16. In the case wherein the duration of the time delay is exactly equal to the time required to scan one line, a signal is applied to the gate 18 when the scanning spot is at a point 22 directly below the point 21. Since a video signal is then developed from the scanning of the image 20, the gate 18 is closed and the pulse is not applied to the flip-flop 15, so that the time delay circuit 16 operates through another cycle of operation.

In the same way, pulses are developed by the multivibrator 17 when the scanning spot reaches points 23, 24, 25 and 26, directly below the points 21 and 22. A sixth pulse is developed by the multivibrator 17 when the spot reaches a point 27 directly below the points 21–26, but at this point no video signal is developed and the gate 18 is enabled so that the pulse is applied to the flip-flop 15 to trigger it to its initial "off" condition and thereby terminate operation of the time delay circuit 16.

A total of six pulses will then have been applied to the counter 13 and shown or registered by the indicator 14 and it will be appreciated that this total represents the dimension of the image measured from the intercept point 21 directly downwardly along a vertical line 28 through the points 21–27.

The dimension need not be measured along the vertical line, but may be measured along a line at an acute angle to the scanning lines. For example, the delay of the time delay circuit 16 may be somewhat less than the scanning line interval, to measure along a line 29 extending angularly downwardly and to the left from the intercept point 21 as shown in FIGURE 2. In the alternative, the delay of the time delay circuit 16 may be somewhat greater than the scanning line interval to measure along a line 30 extending downwardly and to the right from the intercept point 21. Thus with an image having a form as shown in FIGURE 2, eight pulses would be registered in the counter from operation along the line 29 and four pulses would be registered from operation along the line 30, whereas six pulses are registered from operation along the vertical line 28. Accordingly, a dimension of the image may be measured along a particular line as desired.

Figure 3:
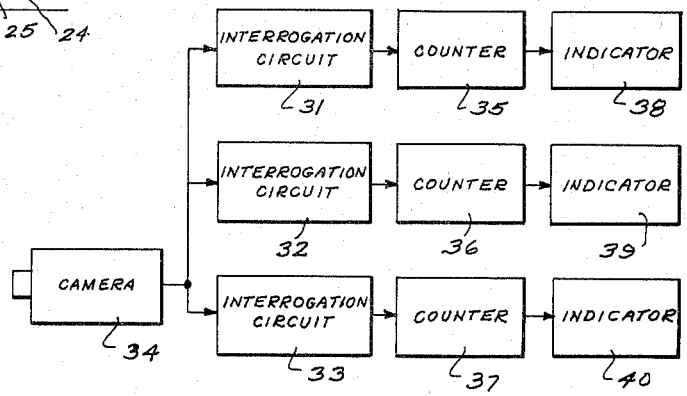
FIGURE 3 is a block diagram of another form of intercept scanning system constructed according to this invention, designed for the measurement of multiple dimensions of an image.

FIGURE 3 illustrates an arrangement in which a plurality of interrogation circuits 31, 32 and 33 are operated simultaneously from a single camera 34, the output of the circuits 31, 32 and 33 being applied to counters 35, 36 and 37 connected to indicators 38, 39 and 40. With this arrangement, the delays produced by the time delay circuits of the three interrogation circuits may be respectively less than, equal to and greater than the scanning line interval to measure from an intercept point along three lines such as lines 29, 28 and 30 of FIGURE 2. Thus information is simultaneously registered by indicators 38–40 giving more complete information as to the size and shape of an image. It will be apparent that additional interrogation circuits may be added to obtain even more complete information.

It is also noted that in the above circuit arrangements, dimensional information is obtained in digital form which may be readily applied to computer, analyzing or control circuitry as desired.

FIGURE 4 illustrates one form of time delay circuit. In this circuit an input terminal 42, which may be connected to the output of the flip-flop 15 of FIGURE 1, is connected through an emitter-follower 43 to an oscillator control circuit 44 connected to an oscillator 45. The oscillator 45 and control circuit 44 operate as an integral unit. The oscillator is a conventional type using an LC circuit so that except when a negative-going signal is applied to the input terminal 42, a swamping load is connected across the oscillator, killing its output. When the load is abruptly removed, by application of a negative-going signal at the input terminal 42, the oscillator is shocked into immediate oscillation so that the first cycle of resulting oscillation is of the same amplitude and duration as all other cycles. The output of the oscillator is a sine wave signal which is applied to a Schmitt trigger circuit 46 where a change of state occurs each time the oscillator passes through a zero axis reference, to develop a triggering pulse at an output terminal 47 which may be applied to the multivibrator 17 of FIGURE 1.

A regulated voltage supply 48 is connected to the oscillator circuit 44 and also to the Schmitt trigger circuit 46 through an adjustable control 49 which applies a small D.C. component controlling the time of operation of the trigger. The Schmitt trigger is extremely sensitive to voltage changes in the vincinity of zero voltage so that a small D.C. component can have the effect of either advancing or retarding the time at which switching occurs, and a time delay can be obtained which is either equal to or somewhat less or greater than a scanning line interval, as desired. In the alternative or in addition, the tuning of the LC circuit of the oscillator 45 can be adjusted.

FIGURE 5 illustrates a modified form of time delay circuit, comprising an input terminal 51 connected to one input of a gate circuit 52 having a second input connected to a high frequency pulse source 53 and having an output connected to the input of a count-down circuit or frequency divider 54, the output of the frequency divider being connected to an output terminal 55. By way of example, the pulse source 53 may be operated at 4.032 megacycles and the division factor of the divider 54 may be 256 to produce a frequency output of 15,750 cycles, equal to the line rate of a conventional television camera.

The gate circuit 52 is enabled by a signal from the input terminal which may be applied from the flip-flop 15 in its "on" condition, and after a delay of 1/15,750 seconds an output pulse is produced at the output terminal 55. The delay may be varied by varying the frequency of operation of the source 53 and/or by varying the division factor of the divider 54.

Referring to FIGURE 6, a reference numeral 59 generally designates another type of intercept scanning system, wherein the video output of a conventional camera 60 is applied to the input of the first of five delay circuits 61–65 connected in cascade, the output of the first circuit 61 being connected to the input of the second circuit 62, and so on. The first delay circuit 61 may produce a relatively large delay, a predetermined amount less than a scanning line interval, and the circuits 62–65 may each produce a relatively short delay. The outputs of the delay circuits 61–65 are respectively connected to the trigger inputs of flip-flops in terrogation circuits 66–70, each of which may be substantially the same as the circuit 12 of FIGURE 1. The video signal from the camera 60 is applied directly to gate circuits of the interrogation circuits 66–70. The outputs of the interrogation circuits 66–70 are applied to counters 71–75 which may be connected to suitable utilization means such as indicator circuits 76–80.

The operation of the system 59 is illustrated in FIGURE 7, which shows diagrammatically a portion of a scanning raster with the vertically spaced horizontal lines representing the path of movement of the scanning spot and with the line 81 representing the outline of a solid image. When the scanning spot reaches a point 82 the leading edge of a video signal is developed and operation of the first delay circuit 61 is initiated. After a certain relatively large delay, somewhat less than a scanning line interval, when the spot is at a point 83 on the next scanning line, the first delay circuit applies an output signal to the second delay circuit 62 and also to the first interrogation circuit. After a relatively short delay, when the spot is at a point 84, the second delay circuit develops an output which is applied to the third delay circuit 63 and also to the second interrogation circuit 67. In a similar fashion, the third, fourth and fifth interrogation circuits are set into operation when the spot is at points 85, 86 and 87 respectively.

Each of the interrogation circuits 66–70 may preferably have a time delay circuit adjusted to produce a delay exactly equal to a scanning interval, so that the circuits 66–70 respectively perform measurements along vertical lines 88–92 through the points 83–87 respectively. Thus an accurate indication of the size and shape of an image can be obtained. It will be apparent, of course, that the accuracy of measurement can be increased by providing additional circuits as desired.

Referring now to FIGURES 8, 9 and 10, reference numeral 100 generally designates another intercept scanning system constructed according to this invention, designed as a pattern or character recognition system. The illustrated system is designed to detect either a T-shaped image 101 as shown in FIGURE 9 or a B-shaped image 102 as shown in FIGURE 10, FIGURES 9 and 10 being diagrammatic illustrations of portion of a scanning raster with the vertically spaced horizontal lines representing the path of movement of a spot in the scanning operation.

In the system 100, the video signal from a camera 103 is applied to the input of a delay line 104, the output of which is connected to an impedance 105 having a value equal to the characteristic impedance of the delay line. The delay line 104 produces an overall delay on the order of a total of five scanning line intervals so that at a given time, a signal pattern as indicated by reference numeral 107 may be produced from the scanning of the T-shaped image 101 while a signal pattern as indicated by reference numeral 108 may be produced from a scanning of the B-shaped image 102 of FIGURE 9.

A series of taps 110 along the delay line 104 are connected either directly or through inverter circuits 111 to AND gates 112 and 113 in the manner as illustrated. With this arrangement, an output signal is obtained from the gate 112 when the signal distribution along the line is according to the curve 107, while an output signal is obtained from the gate 113 when the signal distribution along the delay line is according to the curve 108. Thus an output signal from the gate 112 indicates a T-shaped character while an output signal from the gate 113 indicates a B-shaped character.

Each delay line tap may be considered as being related to a certain area or block of the raster at a particular time, which blocks may be considered as constituting a grid structure. Each block is related to the others by a fixed time correspondence or relationship which holds no matter where a character may be located within a scanning raster. Thus, the system will detect a particular character or pattern regardless of its location.

It is noted that while the illustrated circuit will detect and discriminate between T-shaped and B-shaped images, it is conceivable that the circuits might respond to images having a somewhat different shape. If such images are apt to occur, additional taps and inverters may be used as required. It will be appreciated of course that characters or patterns of substantially any configuration may be detected by suitable connection of delay line taps, inverters and AND circuits, following the principles embodied in the illustrated system. For example, a whole alphabet of characters can be sensed for simultaneously.

It is also noted that the circuits of FIGURES 1, 3 and 6 may be used for character or pattern recognition as well as for the measurement of the dimensions of an image, using the principles of this invention. Likewise, a delay line system such as the system 100 may be readily modified for dimension measurement as well as pattern or character recognition.

It will be understood that other modifications and variations may be effected without departing from the spirit and scope of the novel concepts of this invention.

I claim as my invention:

1. In a system for determining characteristics of an image in an image area,
    means for scanning said image area with a spot moving in a line pattern at a certain line rate to produce a video signal,
    timing means responsive to a change in said video signal produced by an initial intercept of an image by said spot and arranged to develop an output signal after a certain time interval on the order of a scanning line interval,
    means including interrogation gate means responsive to coincidence of said output signal and a video signal of at least a certain amplitude for continuing operation of said timing means, and
    counter means responsive to said output signal.

2. In a system for determining characteristics of an image in an image area,
    means for scanning said image area with a spot moving in a line pattern at a certain line rate to produce a video signal,
    a plurality of interrogation circuits each including timing means responsive to a change in said video signal produced by an initial intercept of an image by said spot and arranged to develop an output signal after a certain time interval on the order of a scanning line interval,
    and means including interrogation gate means responsive to coincidence of said output signal and a video signal of at least a certain amplitude for continuing operation of said timing means,
        said certain time intervals of said timing means of said interrogation circuits being different.

3. In a system for determining the concurrent existence of light of a predetermined intensity differing from a background intensity at points having a predetermined spacial relationship within an image area, means for scanning said image area to produce a video signal, means for developing a control signal in response to a change in said video signal produced by light of said predetermined intensity at one of said points, timing means responsive to said control signal to produce a short-duration gating signal after a predetermined time interval corresponding to said predetermined spacial relationship, and interrogation gate means responsive to said gating signal and said video signal to sense the amplitude of said video signal during said gating signal and to produce an output signal when said video signal corresponds to light of said predetermined intensity during said gating signal.

4. In a system for determining the concurrent existence of light of a predetermined intensity differing from a background intensity at points having a predetermined spacial relationship within an image area, means for scanning said image area to produce a video signal, means for developing a control signal in response to a change in said video signal produced by light of said predetermined intensity at one of said points, timing means responsive to said control signal to produce a short-duration gating signal after a predetermined time interval corresponding to said predetermined spacial relationship, and interrogating gate means responsive to said gating signal and said video signal to sense the amplitude of said video signal during said gating signal and to produce an output signal when said video signal corresponds to light of said predetermined intensity during said gating signal, said timing means comprising an oscillator operated through a predetermined number of cycles of operation in response to said control signal.

5. In a system for determining the concurrent existence of light of a predetermined intensity differing from a background intensity at points having a predetermined spacial relationship within an image area, means for scanning said image area to produce a video signal, means for developing a control signal in response to a change in said video signal produced by light of said predetermined intensity at one of said points, timing means responsive to said control signal to produce a short-duration gating signal after a predetermined time interval corresponding to said predetermined spacial relationship, and interrogation gate means responsive to said gating signal and said video signal to sense the amplitude of said video signal during said gating signal and to produce an output signal when said video signal corresponds to light of said predetermined intensity during said gating signal, said time delay means comprising a high frequency pulse source, a frequency divider, and a gate circuit between said pulse source and the input of said frequency divider controlled by said control signal.

6. In a system for determining a dimension of an image in an image area, means for scanning said image area with a spot moving in a line pattern at a predetermined line rate to produce a video signal, timing means responsive to a delay in said video signal produced by an initial intercept of an image by said spot and arranged to develop a short-duration gating signal after a predetermined time interval on the order of a scanning line interval, and means including interrogation gate means responsive to coincidence of said output signal and a video signal of at least a predetermined amplitude for continuing operation of said timing means when said image exists at a point in predetermined spacial relationship to the point of said initial intercept of the image.

7. In a system for determining a dimension of an image in an image area, means for scanning said image area with a spot moving in a line pattern at a predetermined line rate to produce a video signal, a plurality of interrogation circuits each including timing means responsive to a control signal for developing an output signal after a predetermined time interval on the order of a scanning line interval, means including interrogation gate means responsive to coincidence of said output signal and a video signal of at least a predetermined amplitude for continuing operation of said timing means when said image exists at a point in predetermined spacial relation to the point of said initial intercept of the image, said predetermined time interval of operation of said timing circuits of all of said interrogation circuits being substantially the same, and means for applying control signals to said timing means of said interrogation circuits at times in predetermined relation to each other.

8. In a system for determining the concurrent existence of light of a predetermined intensity differing from a background intensity at points having a predetermined spacial relationship within an image area, means for scanning said image area to produce a video signal, gate control means responsive to said video signal to produce a gating signal in response to a predetermined amplitude of said video signal and at a predetermined time interval after production of said predetermined amplitude of said video signal, and interrogation gate means responsive to said gating signal and said video signal to sense the amplitude of said video signal during said gating signal and to produce an output signal when said video signal corresponds to light of said predetermined intensity during said gating signal.

References Cited by the Examiner

UNITED STATES PATENTS

| 2,561,197 | 7/1951 | Goldsmith | 178—6.8 |
| 2,674,917 | 4/1954 | Summerhayes | 88—14 |
| 3,011,152 | 11/1961 | Eckdahl | 340—146.3 |
| 3,114,131 | 12/1963 | Furr et al. | 340—146.3 |

FOREIGN PATENTS

| 1,116,910 | 11/1961 | Germany. |
| 136,060 | 5/1960 | Russia. |

OTHER REFERENCES

Izzo and Coles: "Blood-Cell Scanner Identifies Rare Cells," Electronics, April 27, 1962, pp. 52–57.

DAVID G. REDINBAUGH, *Primary Examiner.*

J. McHUGH, *Assistant Examiner.*